March 1, 1966  J. N. PRESTON  3,237,405
THERMAL REACTION TORQUE-GENERATING ENGINE SYSTEM
Filed June 2, 1965

James N. Preston

United States Patent Office 3,237,405
Patented Mar. 1, 1966

3,237,405
THERMAL REACTION TORQUE-GENERATING ENGINE SYSTEM
James N. Preston, 1633 W. Campbell, Phoenix, Ariz.
Filed June 2, 1965, Ser. No. 460,755
4 Claims. (Cl. 60—39.69)

This application is a continuation-in-part of the applicant's earlier-filed application Serial No. 214,712 which was filed August 3, 1962 as a continuation-in-part of the applicant's earlier-filed application Serial No. 169,-886, filed January 30, 1962 which discloses an engine whose basic operability is based upon the patented operability of the engine disclosed in the applicant's earlier-filed application Serial No. 138,362, now Patent No. 3,092,967 to provide torque energy from fluid expanded by means of thermal energy.

The object of this invention, originally disclosed in application 214,712, is to produce torque horsepower by means of utilizing thermal energy from any source including nuclear energy and any combustible fuel such as petroleum-derived fuels, coal, wood, baled and pelleted grass. The improvement is mainly in the combustion chamber and heat exchanger.

The purpose of this application is to more clearly describe only the essential patentable matter originally disclosed in application 214,712, including improvements in connection with the system of basic component parts of the engine disclosed in application 169,886 and application 138,362, now Patent 3,092,967, without including unpatentable details of motor means and compressor means but retaining the combination of basic component parts and their functions in the system necessary to accomplish the object of this invention.

Figure 2:
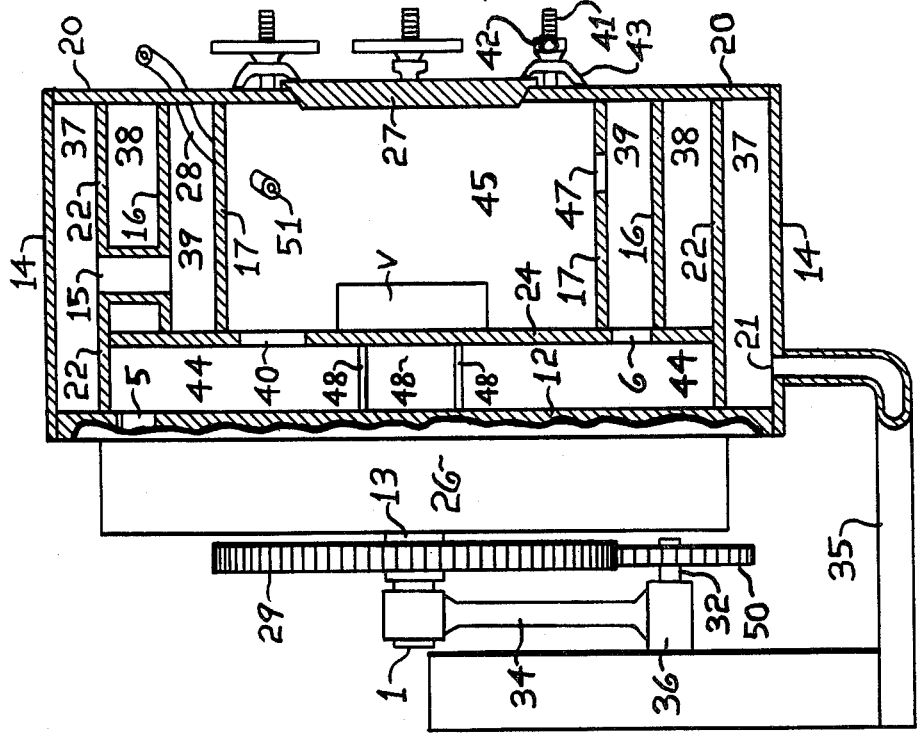
FIGURE 2 shows a partial cross-section of the adjacent side view of the engine.
Figure 1:
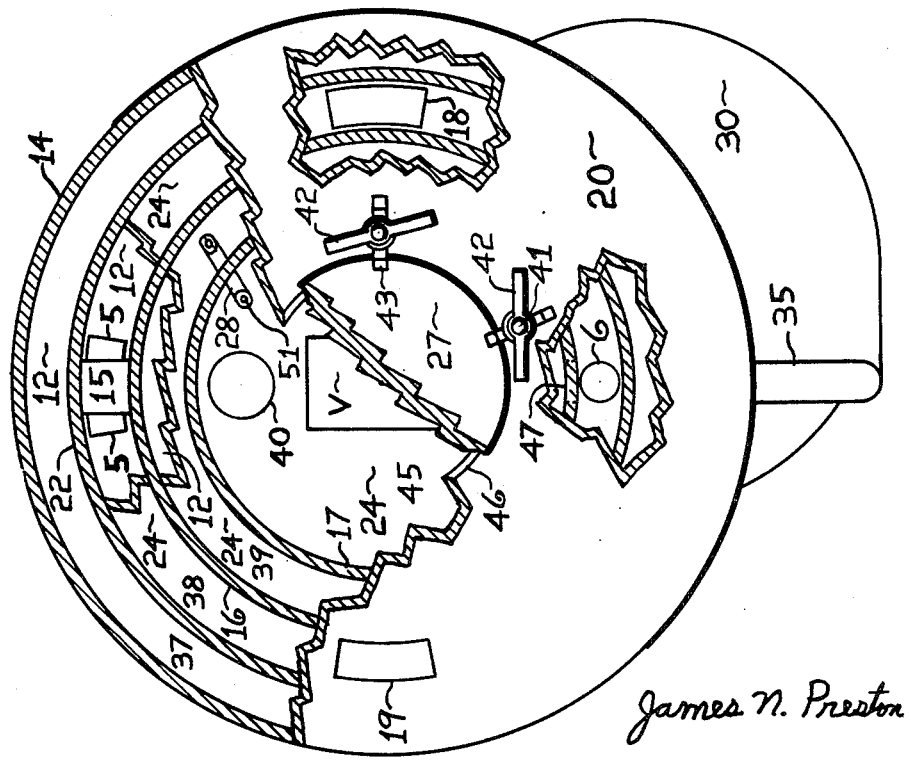
FIGURE 1 shows a partial cross-section of the front view of the engine.

Referring in more detail to the drawing, the compression chamber 37 is bounded on its concentric outer side by the compression cylinder 14, on its concentric inner side by the heat exchange cylinder 22, and on either adjoining side by the adjoining basic compression disc 20 and compression end disc 12 respectively.

The bypass chamber 44 is bounded on its concentric outer side by the heat exchange cylinder 22 and on either adjoining side by the adjoining compression disc 12 and the firewall disc 24 respectively.

The heat exchange chamber 38 is bounded on its concentric outer side by the heat exchange cylinder 22, on its concentric inner side by the thermal conduction cylinder 16 and on either adjoining side by the adjoining firewall disc 24 and the basic compression disc 20 respectively.

The secondary compression chamber 39 is bounded on its concentric outer side by the thermal conduction cylinder 16, on its concentric inner side by the firewall cylinder 17 and on either adjoining side by the adjoining firewall disc 24 and basic compression disc 20 respectively.

The combustion chamber 45 is bounded on its concentric outer side by the firewall cylinder 17 and on either adjoining side by the adjoining firewall disc 24 and the basic compression disc 20 respectively. The firedoorway 46 opens through the basic compression disc 20 into the combustion chamber 45. The firedoor 27 is provided to close the firedoorway 46 and is secured in closed position by means of the bolts 41, brackets 43, and threaded tighteners 42. The nuclear source of thermal energy within the combustion chamber 45 is located at V. The fuel pipe 28 opens into the combustion chamber 45 at the fuel intake port 51. The combustion intake port 47 opens from the secondary compression chamber 39 through the firewall cylinder 17 into the combustion chamber 45. The combustion exhaust port 40 opens from the combustion chamber 45 through the firewall disc 24 into the bypass chamber 44 and is of a larger size than the combustion intake port 47.

The conduit 15 channels fluid from the compression chamber 37 through the heat exchange cylinder 22 in a radial direction through the level of the heat exchange chamber 38 and through the thermal conductor cylinder 16 into the secondary compression chamber 39. The bypass intake port 6 opens from the secondary compression chamber 39 through the firewall disc 24 into the bypass chamber 44.

Number 26 represents motor means, having stationary means in connection with the axle 1 and rotatable means in connection with the hub 13, operating to harness pressure of fluid conducted into said motor means 26 to rotate, continuously, the rotatable means of said motor means 26 and to exhaust fluid therefrom continuously following rotation of said rotatable means of said motor means 26.

Number 30 represents compressor means, having stationary means in connection with the compressor hub 36 and rotatable means in connection with the compressor axle 32, to utilize torque energy of the rotatable means of said compressor means 30 to compress fluid into the adjoining compression conduit 35. The compressor hub 36 is connected to the axle 1 by means of the adjoining support brace 34. The compressor means 30 operates to compress fluid, generally air, continuously into the adjoining compression conduit 35 which conducts fluid through the compression chamber intake port 21 into the compression chamber 37 continuously when the compressor axle 32 and the rotatable means of the compressor means 30 is rotated in the operation of the engine.

The compressor gear 50 is affixed to the compressor axle 32 and the power gear 29 is affixed to the hub 13 and said power gear 29 is in mesh with the compressor gear 50 to transmit torque energy from the rotatable means of the motor means 26 to the rotatable means of the compressor means 30 to compress fluid continuously into the compression conduit 35 in the operation of the engine.

Any combustible solid, liquid, or gas fuel is entered into the combustion chamber 45 through the fuel pipe 28 at the fuel intake port 51 generally by pump means. Said combustion chamber 45 is charged with any combustible fuel through the firedoorway 46 and sealed therein by means of the firedoor 27. Nuclear energy is provided at V. Fluid, compressed from the compressor means 30, is conducted continuously through the compression conduit 35 into the compression chamber 37 and therefrom conducted continuously through the conduit 15 into the secondary compression chamber 39 wherefrom fluid is conducted continuously through the combustion intake port 47 into the combustion chamber 45 wherein expanded to a larger fluid volume by means of thermal energy of combustion therein and thermal energy from nuclear energy located at V. Fluid, normally air, is ignited with any combustible fuel by ignition means and expands to a larger fluid volume which increases the p.s.i. pressure and velocity of the fluid being conducted through the combustion exhaust port 40 to a degree approaching the p.s.i. pressure and velocity of the fluid being conducted through the combustion intake port 47 which is provided with a smaller size than the size of the combustion exhaust port 40. The degree of combustion is controlled by air intake volume control means and by fuel intake volume control means.

The larger fluid volume, normally ignited and expanding combustion gases, is conducted continuously from the combustion chamber 45 through the combustion exhaust port 40 into the bypass chamber 44 and is conducted continuously from said bypass chamber 44 through the bypass exhaust port 5 into the motor means 26 to provide said motor means 26 with fluid to rotate the rotatable means of said motor means 26 which rotates the hub 13, power gear 29, compressor gear 50, the compressor axle 32, and rotatable means of the compressor means 30 in the operation of the engine. The motor means 26, geared to the compressor means 30, operates to harness the heated and expanded larger volume of fluid from the adjoining bypass chamber 44 to rotate the rotatable means of said motor means 26 and thereupon to exhaust fluid therefrom continuously following rotation of said rotatable means of said motor means 26 and to generate thereby more torque energy from the larger volume of fluid than is required to rotate the rotatable means of the compressor means 30 to compress fluid into the compression conduit 35 at any given time in the operation of the engine to provide thereby usable torque energy from pressure of fluid expanded by means of thermal energy and continue the torque-generating cycle. The engine operates to thereby provide usable torque energy from pressure of fluid expanded by means of thermal energy of nuclear energy and from pressure of fluid expanded by means of thermal energy of combustion of fluid, generally air, and any combustible fuel.

Fluid exhausted from the motor means 26 is conducted continuously across the plane of the bypass chamber 44 through the back-pressure exhaust port 18 within the exhaust channel walls 48 and through the firewall disc 24 into the heat exchange chamber 38 wherein the heat exchange cylinder 22 conducts thermal energy from fluid therein into fluid within the compression chamber 37 and the thermal conduction cylinder 16 simultaneously conducts thermal energy from fluid within said heat exchange chamber 38 into fluid within the secondary compression chamber 39 and the heat exchange exhaust port 19 conducts fluid continuously from said heat exchange chamber 38 through the basic compression disc 20 normally into the atmosphere in the operation of the engine.

In the operation of the engine, fluid from the compressor means 30 is conducted continuously through the compression chamber 37 and therein absorbs thermal energy conducted from the heat exchange chamber 38 and fluid is conducted continuously therefrom through the conduit 15 into the secondary compression chamber 39 and therein absorbs thermal energy conducted from the heat exchange chamber 38 and thermal energy conducted from the combustion chamber 45 through the firewall cylinder 17. Pre-heated fluid is conducted continuously from the compression chamber 37 into the secondary compression chamber 39 and therefrom conducted continuously through the combustion intake port 47 into the combustion chamber 45 and pre-heated fluid is simultaneously conducted continuously from said secondary compression chamber 39 through the bypass intake port 6 into the bypass chamber 44 wherefrom being conducted, along with fluid flowing therein from the combustion chamber 45, through the bypass exhaust port 5 continuously into the motor means 26 to provide said motor means 26 with heated and expanded fluid to provide maximum torque energy per unit of fuel consumption for maximum efficiency in the operation of the engine.

Having thus described the invention, I claim:

1. An engine comprising means to provide torque energy from thermal energy from any source including thermal energy produced by nuclear means and by means of combustion of any combustible fuel with fluid, generally air; said means including motor means, having rotatable means and stationary means, operating to harness pressure of fluid conducted into said motor means to rotate the rotatable means of said motor means and thereupon to exhaust fluid therefrom continuously following rotation of said rotatable means of said motor means; means including compressor means, having rotatable means and stationary means, operating to utilize torque energy of rotatable means of said compressor means to compress fluid into an adjoining compression conduit; stationary means of said motor means being in connection with the stationary means of the compressor means and in connection with a bypass chamber; rotatable means of the motor means being geared by means of generally gear-type torque-transmission means to transmit torque energy to rotatable means of the compressor means in the operation of the engine to provide compression of fluid, generally air, continuously into the compression conduit functioning to conduct fluid continuously from said compressor means into an adjoining compression chamber; fluid being conducted continuously by adjoining conduit means from the compression chamber into a secondary compression chamber wherefrom fluid being conducted continuously through a bypass intake port into the bypass chamber and fluid being simultaneously conducted continuously from said secondary compression chamber through a combustion intake port into a combustion chamber wherefrom fluid being conducted continuously into the bypass chamber through a combustion exhaust port of larger size than the size of the combustion intake port and fluid being conducted continuously from said bypass chamber through a bypass exhaust port into the adjoining motor means; thermal energy being provided within the combustion chamber by means of nuclear energy and by means of combustion of fluid, generally air, and any combustible fuel therein to heat and expand fluid therein to increase the p.s.i. pressure and velocity of fluid being conducted from the combustion chamber at the combustion exhaust port to a degree approaching the p.s.i. pressure and velocity of the fluid being conducted into said combustion chamber at the combustion intake port in the operation of the engine; any combustible fuel being entered into the combustion chamber, generally by pump means, through a fuel pipe and ignited by the ignition means; a firedoorway provided through a wall of the combustion chamber through which to pile combustible fuel into the combustion chamber and a firedoor provided to close and seal said firedoorway; the combustion chamber being located concentrically adjoining the inner walls of the concentric secondary compression chamber and adjoining walls functioning to conduct thermal energy from said combustion chamber into the secondary compression chamber to pre-heat and expand fluid therein in the operation of the engine; in the operation of the engine, pre-heated fluid being conducted continuously from the compressor means and compression chamber into the secondary compression chamber wherefrom being conducted continuously through the combustion intake port into the combustion chamber wherein heated and expanded further and pre-heated fluid being conducted continuously from said secondary compression chamber simultaneously through the bypass intake port into the bypass chamber wherefrom being conducted continuously, along with heated and expanded fluid flowing therein from the combustion chamber to provide the motor means with fluid to rotate the rotatable means of said motor means; fluid exhausted from the motor means being conducted continuously by connecting conduit means into a heat exchange chamber located concentrically adjoining the outer walls of the secondary compression chamber and concentrically adjoining the inner walls of the compression chamber; adjoining walls of the heat exchange chamber conducting thermal energy from fluid therein into fluid within the compression chamber and into fluid within the secondary compression chamber to pre-heat fluid therein to expand fluid therein and fluid being conducted continuously from said heat exchange chamber generally into the atmosphere; the expansion of fluid by means of thermal energy within the combustion chamber, compression chamber, secondary compression chamber, and bypass chamber providing a larger volume of fluid to the motor means than the volume of fluid being compressed continuously out of the compressor means at any given time in the operation of the engine; the motor means, geared to the compressor means by the torque-transmission means, operating to harness the heated and expanded larger volume of fluid conducted thereto from the bypass chamber to rotate the rotatable means of the motor means and to thereupon exhaust fluid therefrom continuously following rotation of the rotatable means of said motor means and thereby generate more torque energy than required to rotate the rotatable means of the compressor means at any given time in the operation of the engine to thereby provide usable torque energy from fluid expanded by means of thermal energy and continue the torque-generating cycle; the motor means, geared to the compressor means, operating to harness the heated and expanded larger volume of fluid flowing from the bypass chamber so that the degree of p.s.i. pressure and velocity of the heated and expanded larger volume of fluid flowing from said combustion chamber approaches any given p.s.i. pressure and velocity of fluid flowing into said combustion chamber at any given time in the operation of the engine.

2. The invention as claimed in claim 1 wherein thermal energy within the combustion chamber being provided by means of nuclear energy to heat and expand fluid within the combustion chamber, secondary compression chamber, compression chamber and bypass chamber to provide a larger volume of fluid to the motor means than the volume of fluid flowing out of the compressor means at any given time in the operation of the engine; the motor means, geared to the compressor means, operating to harness the heated and expanded larger volume of fluid conducted thereto from the bypass chamber so that the degree of p.s.i. pressure and velocity of the larger volume of fluid flowing from said bypass chamber approaches any given p.s.i. pressure and velocity of fluid flowing into the combustion chamber at any given time in the operation of the engine to rotate the rotatable means of the motor means to generate more torque energy than required to rotate the rotatable means of the compressor means at any given time in the operation of the engine and to thereupon exhaust fluid therefrom continuously following rotation of said rotatable means of said motor means and thereby provide usable torque energy from fluid expanded by means of thermal energy and continue the torque-generating cycle in the operation of the engine.

3. The invention as claimed in claim 1 wherein the source of thermal energy within the combustion chamber being provided by means of combustion of any solid, liquid, or gas combustible fuel, including petroleum-derived fuels, coal, wood, baled and pelleted grass, etc. with air within the combustion chamber to heat and expand fluid within said combustion chamber and within the compression chamber, secondary compression chamber, and bypass chamber to provide a larger volume of fluid, being generally combustion gases, to the motor means than the volume of fluid flowing out of the compressor means at any given time in the operation of the engine; the motor means, geared to the compressor means, operating to harness the larger volume of fluid conducted thereto from the bypass chamber so that the degree of pressure and velocity of the larger volume of fluid flowing from said bypass chamber approaches any given p.s.i. pressure and velocity of fluid, generally air, flowing into the combustion chamber at any given time in the operation of the engine to rotate the rotatable means of the motor means to generate more torque energy than required to rotate the rotatable means of the compressor means at any given time in the operation of the engine and to thereupon exhaust fluid therefrom continuously following rotation of the rotatable means of said motor means and thereby provide usable torque energy from fluid expanded by means of thermal energy and continue the torque-generating cycle in the operation of the engine.

4. The invention as claimed in claim 1 wherein fluid, generally air, flowing simultaneously from the secondary compression chamber into the bypass chamber and from the combustion chamber into said bypass chamber and therefrom into the motor means to generate usable torque energy from fluid expanded by means of thermal energy of combustion with any combustible fuel and fluid, generally air, within the combustion chamber in the operation of the engine; the fluid flowing from the secondary compression chamber into the bypass chamber being expanded by means of thermal energy conducted into said secondary compression chamber and fluid within the bypass chamber combining with combustion gases from the combustion chamber and conducted therefrom into the motor means to generate torque energy.

No references cited.

MARK NEWMAN, *Primary Examiner.*